UNITED STATES PATENT OFFICE.

EDWARD HUBBARD RUSSELL, OF PARK CITY, UTAH TERRITORY.

PROCESS OF SEPARATING METALS FROM ORES AND METALLURGICAL PRODUCTS.

SPECIFICATION forming part of Letters Patent No. 295,887, dated March 25, 1884.

Application filed December 10, 1881. (No specimens.)

*To all whom it may concern:*

Be it known that I, EDWARD H. RUSSELL, of Park City, in the county of Summit and Territory of Utah, have invented certain Improvements in the Separation of Metals from Ores and Metallurgical Products, of which the following is a specification.

The object of this invention is to secure the separation of gold and silver from their ores and metallurgical products by the leaching process, and to effect the separation of the lead from these metals by itself as a carbonate of that metal.

To this end the invention consists in using a soluble carbonate in connection with the usual hyposulphite solution. This carbonate may be a carbonate or bicarbonate of either sodium or potassium; but, as a cheap article is essential, soda-ash—an impure but inexpensive carbonate of soda—is the most suitable.

In the ordinary process of leaching, compounds of silver and gold are extracted from their ores by leaching with a solution of a hyposulphite of an alkali or alkali earth in which these compounds are soluble. Unfortunately the sulphate and chloride of lead which are often present in these ores are also soluble in the hyposulphite solution. These lead compounds, being leached out of the ore along with the precious metals, contaminate the bullion which is produced. Owing to the presence of this lead in the bullion, the subsequent refining of that bullion becomes an expensive process, and the leaching process has therefore been unsuitable for certain kinds of ores.

The object of my invention is to remove this objectionable feature of the leaching process and secure the separation of the precious metals from the lead. This I do in the following manner: In the ordinary process of leaching, the hyposulphite solution, after it has passed through the ore and dissolved both the precious metals and lead compounds, is conducted into tanks, and both the precious and base metals are precipitated together, usually as sulphides, by means of sodium or calcium sulphide; but by my invention the solution, after leaving the ore or product, is first conducted into a separate set of tanks, and a sufficient quantity of the aforesaid carbonate of soda is added to convert all the lead compound into carbonate of lead. A slight excess of carbonate of soda should be added. The carbonate of lead, being insoluble in the hyposulphite solution, sinks to the bottom. The compounds of the precious metals, however, are not precipitated with the lead. After the precipitation of the lead, the solution containing the silver and gold is conducted into separate tanks, and these metals are then precipitated by the common methods, usually as sulphides. As a result of my invention, the bullion produced from these sulphides contains no lead, but the lead is obtained by itself in such a form that it is of considerable value. This process thus becomes more economical for certain ores or metallurgical products than those now in use.

I find that copper, if present in the solution, will not be precipitated with the lead, but will be precipitated, as usual, with the precious metals.

The action of the soluble carbonate, when added to the hyposulphite solution containing precious metals, is peculiar. When added to aqueous solutions of the compounds of these metals, it precipitates lead and precious metals all together. Such action of the carbonate in aqueous solutions is well known, and I do not claim it as having been discovered by me; but I have discovered that when added to a hyposulphite solution, after the same has been used to leach the ore or product, the carbonate precipitates the lead alone, and leaves the silver, copper, and gold that are present in the solution unprecipitated. This peculiar action of the carbonate on the metals dissolved in the hyposulphite solution has, I believe, never heretofore been known, and has not been made use of in quantitive or qualitative analyses in the laboratory, nor is it to be found set forth or described in any work on chemistry or the treatment of ores.

This process differs from that described in the application hitherto filed by me May 28, 1881, No. 34,710, in that the present process removes the lead from the ore or product, while in the former it was left in the ore or product and permitted to go to waste.

My process is intended to be used particularly in connection with ores which have previously been subjected to a chloridizing roast; but it is also applicable to some raw ores in which the silver exists in a form which is soluble in the hyposulphite, and to ores which have been exposed to chlorine gas.

It is obvious that, instead of leaching the ores or products with the hyposulphite solution and then adding the carbonate, the ores or products can be subjected to the dissolving action of the solution in any of the ways well known to those familiar with the art without departing from the spirit of my invention.

Having thus described my invention, what I claim is—

1. The process of removing precious metals and lead from their ores or metallurgical products and separating them from each other, consisting in dissolving them both out of the ore or product with a hyposulphite solution, and then adding to the resulting solution a soluble carbonate to precipitate the lead, substantially as set forth.

2. The process of removing precious metals and lead from their ores and from metallurgical products and separating them from each other, consisting in leaching the ore or product with a hyposulphite solution, and then adding to the solution containing the precious metals and lead a soluble carbonate to precipitate the lead, substantially as described.

3. The process of separating precious metals and lead from ores and metallurgical products and from each other, consisting in leaching the ore or product with a hyposulphite solution, to dissolve out both the precious metals and lead, then adding to the resulting solution a soluble carbonate to precipitate the lead, and finally removing the remaining solution and precipitating therefrom the precious metals, substantially as described.

4. As an improvement in the art of extracting metals from their ores or from metallurgical products, the process consisting in leaching the ore or product with a hyposulphite solution, to dissolve out both the precious metals and the lead, and subsequently precipitating the lead and precious metals separately from the solution, substantially as described.

5. The process of separating metals from their ores and from each other, consisting in treating the ore with a hyposulphite solution, to dissolve the precious metals and the lead, then adding a soluble carbonate to precipitate the lead, and finally treating the solution separately to precipitate the precious metals.

EDWARD HUBBARD RUSSELL.

Witnesses:
 JOHN KEETLEY,
 WALTER ALMY.